United States Patent [19]

Diels

[11] 4,188,538
[45] Feb. 12, 1980

[54] EFFICIENT PARTICLE EXCITATION

[75] Inventor: Jean-Claude Diels, Pacific Palisades, Calif.

[73] Assignee: University of Southern California, Los Angeles, Calif.

[21] Appl. No.: 782,869

[22] Filed: Mar. 30, 1977

[51] Int. Cl.² .............................................. H01J 27/00
[52] U.S. Cl. ................................ 250/423 P; 250/281
[58] Field of Search ............... 250/423 P, 423 R, 281

[56] References Cited

U.S. PATENT DOCUMENTS

| | | | |
|---|---|---|---|
| 3,772,519 | 11/1973 | Levy et al. | 250/423 P |
| 3,987,302 | 10/1976 | Hurst et al. | 250/423 P |
| 4,035,638 | 7/1977 | Szoke | 250/423 P |
| 4,038,549 | 7/1977 | Janes et al. | 250/423 P |

*Primary Examiner*—Harold A. Dixon
*Attorney, Agent, or Firm*—Nilsson, Robbins, Dalgarn, Berliner, Carson & Wurst

[57] ABSTRACT

A method of irradiating a collection of particles by ultrashort pulses of light with isotopic selectivity having application in various methods of isotope separation (two step photoionization, photochemical separation or radiation pressure). In particular there is disclosed a method and apparatus for the efficient acceleration and collection of particles by means of radiation pressure, exemplified by separating a preselected isotope species from a gaseous mixture of isotopes. The gaseous mixture is irradiated with ultrashort, repetitious pulses of coherent light, each pulse having an intensity, frequency and duration selected to create momentum changes in the preselected gaseous isotope whereby to spatially isolate the isotope. Preferably, irradiation is carried out in the cavity of a mode-locked laser into which the gaseous mixture is injected. The pulses traverse and reflect back through the cavity so that the selected isotope is initially excited by a pulse, then restitutes its energy to the reflected pulse by stimulated emission. Means are provided for collecting the spatially isolated isotope.

17 Claims, 6 Drawing Figures

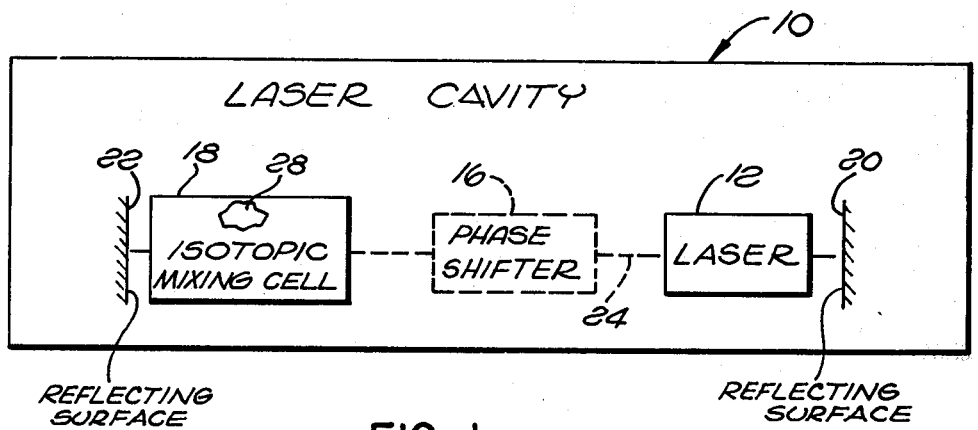
FIG. 1
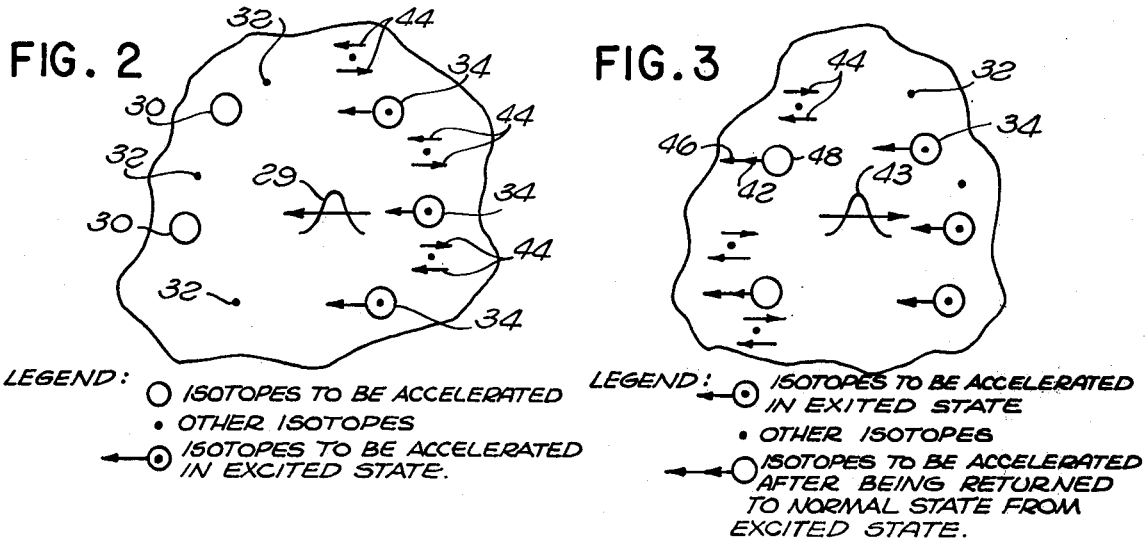
FIG. 2
LEGEND:
○ ISOTOPES TO BE ACCELERATED
• OTHER ISOTOPES
⊙→ ISOTOPES TO BE ACCELERATED IN EXCITED STATE.
FIG. 3
LEGEND:
⊙→ ISOTOPES TO BE ACCELERATED IN EXITED STATE
• OTHER ISOTOPES
○→ ISOTOPES TO BE ACCELERATED AFTER BEING RETURNED TO NORMAL STATE FROM EXCITED STATE.
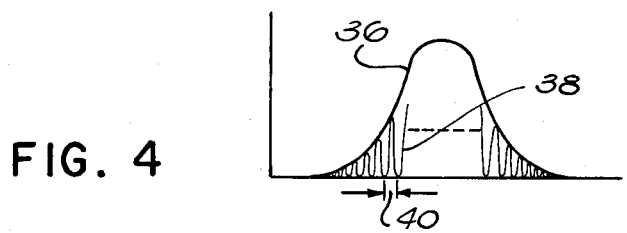
FIG. 4
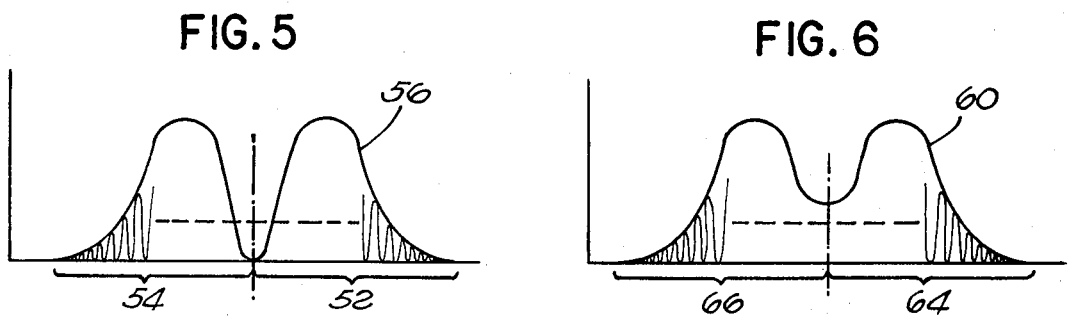
FIG. 5
FIG. 6

EFFICIENT PARTICLE EXCITATION

FIELD OF THE INVENTION

The field of art to which the invention pertains includes the field of isotope separation, specifically through light irradiation.

BACKGROUND AND SUMMARY OF THE INVENTION

The method of irradiation by pulses shorter than the phase relaxation time of the matter to be excited (collision time of particles in a gas) yields better selectivity for the same amount of excitation of a selected particle than conventional irradiation by continuous light or longer pulses. Such relaxation times or collision times are usually on the order of picoseconds to nanoseconds with a practical upper limit of 10 nanoseconds. Accordingly this invention relates to an improved method and apparatus for the efficient excitation, acceleration and trapping of particles by means of light radiation pressure, which particles are otherwise free to move with respect to their environment, exemplified by separation of isotopes. Previous methods utilizing light irradiation of an isotopic mixture for separation of a preselected isotope are many and varied. Examples include Ashkin U.S. Pat. No. 3,710,279, Pressman U.S. Pat. No. 3,558,877 and Braunstein et al, U.S. Pat. No. 3,532,879 in which isotopic separation is obtained through irradiation by a continuous wave of coherent light at the absorption wavelength of one of the isotopes. These methods are inefficient in that:

(a) The ratio of the kinetic energy acquired by the atom or molecule of mass M compared to the energy $\hbar \nu$ of the absorbed proton is small. The ratio is given by $\eta = \hbar \nu / 2Mc^2$ and is less that $10^{-7}$.

(b) In order to excite a large fraction of the selected isotopes per unit time, high intensities are required for the exciting radiation. However, even at the highest intensities, corresponding to saturation, no more than 50% of the isotopes to be separated can be excited at one time.

(c) The greater the intensity, the broader the energy spectrum excited by the irradiation, an effect known as "power broadening". Thus, as higher intensity light is used to maximize the excitation rate of the isotopes to be excited, the less selective the radiation is with respect to the other isotopes. Accordingly, the energy required for a high isotope production rate conflicts with a requirement for high selectivity.

(d) On photon (at most) is used—only once—to push an atom or molecule. The quantum of efficiency is thus limited to $\hbar \nu / 2Mc^2$.

The present invention overcomes the foregoing disadvantages by using a train of ultrashort pulses as the irradiating light and by disposing particles (atoms or molecules) to be accelerated, or a mixture of particles to be separated, in the end cavity of a mode-locked laser. The laser pulses each have a duration shorter than the phase relaxation time of the particles to be accelerated. Particles which are resonant with the frequency of the laser beam pulses are excited, giving them a momentum in the direction of the beam. As the pulses are reflected back through the cavity, the previously excited particles restitute their energy to the reflective pulses by stimulated emission. The restituting particle emits in the direction of travel of the reflected pulse, receiving additional momentum in the opposite direction so that it accelerates further in the direction of the original pulse. The accelerated particles thus can be spatially isolated and can be collected using known techniques.

Also disclosed are three pulse configurations, each of which interreacts with the particles contained in the particle mixture differently, but all of which result in a net momentum imparted to the particle to be accelerated. One pulse configuration is essentially "bell shaped" (Gaussian). When this pulse is used for "single photon" absorbing transitions, the pulse is tuned at resonance with a transition of the desired particle to be excited and accelerated. When it is used for "two-photon transitions", it is tuned close to resonance, with half of the transition frequency of the desired particle to be excited and accelerated. In addition, the "bell shaped" pulse can be configured to contain two frequencies to use with two-photon transitions. A second pulse configuration termed "zero-area" pulse applies only to direct "single-photon" absorbing transitions, and is tuned at resonance with an unwanted particle (the particle which is not to be excited—and—in the particular case of the proposed radiation pressure apparatus—which is not to be accelerated). The "zero-area" pulse has a frequency spectrum sufficiently broad to contain energy at the light absorption wavelength of the desired particle (to be excited and—in the particular case of the radiation apparatus described here—accelerated). The third pulse configuration is the "two-photon" transition correspondent of the "zero-area" pulse and is termed "90° phase shifted", because half of that pulse is 90° out of phase with the other half. The "90° phase shifted" pulse is tuned close to resonance with half of the transition frequency of the unwanted element (not to be excited or accelerated).

BRIEF DESCRIPTION OF THE DRAWINGS

FIG. 1 is a diagramatic illustration of the apparatus in accordance with this invention;

FIG. 2 is a greatly enlarged portion of the isotopic mixture contained within the isotopic mixture cell of FIG. 1 diagramatically illustrating the various isotopes contained therein and their respective excitation states and momentum characteristics acquired as a result of a light pulse passing therethrough;

FIG. 3 shows the same portion of the isotopic mixture contained within the isotopic mixture cell of FIG. 1 as a reflected light pulse passes therethrough;

FIG. 4 is a graphic representation of a Gaussian shaped pulse as emitted by the laser of FIG. 1 and which is utilized in an embodiment of the invention;

FIG. 5 is a graphic representation of a 180° phase shifted pulse ("zero-area" pulse) as utilized in another embodiment of the invention; and FIG. 6 is a graphic representation of a 90° phase shifted pulse as utilized in still another embodiment of the invention.

DETAILED DESCRIPTION

As required, detailed illustrative embodiments of the invention are disclosed herein. The embodiments exemplify the invention and are currently considered to be the best embodiments for such purposes. However, it is to be recognized that the apparatus may be constructed and the light pulses constituted in various other forms different from those disclosed. Accordingly, the specific details disclosed are representative and provide a basis for the claims which define the scope of the present invention.

In this regard, the apparatus and method may be used with only a single particle species, for example to induce chemical interactions by accelerating one molecule into a reaction medium, to aid in fusion of light elements, or to generate certain types of signals. (See for example, Ashkin U.S. Pat. No. 3,710,279.) However, I find great utility in its ability to efficiently separate particles having closely similar physical properties, exemplified by isotopes. The description of the invention will, therefore, be directed specifically to the separation of isotopes, but it will be understood that the invention applies to the acceleration of particles in general and to all particles, ionized or neutral, atoms or molecules, which are substantially free to move with respect to their environment. In this regard particles can be gaseous, liquid or solid.

I have discovered that isotopic selectivity and percentage excitation can be enhanced by optical excitation with ultrashort pulses whose shape, intensity, duration and intraphase relationships have been optimized. The method of using mode-locked laser pulses of appropriate temporal shape and intensity for isotopically selective optical excitation is described hereinbelow, particularly as it applies to particle acceleration by radiation pressure. The method, however, is more general and the use of a mode-locked laser with the appropriate pulse shaping as described below is calculated to yield, for example, a one hundred times larger extraction rate of $Li^6$ by two step photoionization as compared to the method using conventional pulses. As such, the short pulse excitation methods to be described are an improvement over the isotope separation U.S. Pat. Nos. 3,443,087 of Robieux et al, 3,772,519 of Levy et al and 3,935,451 of Janes. It also applies to the selective optical excitation in photochemical separation processes.

As above indicated, the second aspect of this invention relates to an apparatus and method for making more efficient the acceleration and trapping of particles by means of radiation pressure. Accordingly, a gaseous mixture containing various isotopes, one of which is to be accelerated, is placed near an end mirror of the cavity of a mode-locked dye laser. In one embodiment, isotopes which are resonant with the frequency of light pulses emitted by the dye laser are excited, giving them a first momentum increment in the propagation direction of the pulses. After the pulses are transmitted back through the cell from the end cavity mirror, the previously excited isotopes are restored to their initial state by restituting their energy to the laser pulse by stimulated emission. In this process, the isotopes emit a photon in the direction of the reflected pulse, receiving a second momentum increment which is in the same direction as, and additive to, the first momentum increment.

Referring to FIG. 1, there are illustrated elements of the apparatus contained within a laser cavity 10. Included are a laser 12 to provide substantially monochromatic, coherent light pulses at a predetermined rate, optionally a phase shifter shown in shadow at 16, an isotopic mixture cell 18, a first reflecting surface 20 and a second reflecting surface 22. The first and second reflecting surfaces 20 and 22, located at each end of the laser cavity 10, enable the laser 12 to operate in a mode-locked manner. Any form of mode-locked laser can be used, but a dye laser is particularly advantageous as enabling one to "tune" the wavelength of light to that optimumly absorbed by a selected isotope. In operation, the dye laser emits a continuous series of Gaussian shaped light pulses at the absorption wavelength of the isotope to be accelerated as an outward traveling beam along a predetermined path 24 to the phase shifter 16. In a first embodiment the phase shifter is not utilized. In further embodiments to be discussed hereinbelow, the phase shifter 16 will reshape the pulse into two portions, the second portion of which will contain light at a wavelength which is either 180° or 90° out of phase with that of the first portion. A straight laser cavity can be used as shown in FIG. 1. It may be advantageous, however, for some applications to include the pulse shaper in a "ring laser cavity". This, however, does not modify the description of operation and particle interactions between the phase shifter 16 and the second reflecting surface 22.

In the first embodiment, the outwardly traveling beam containing Gaussian shaped light pulses enters the isotopic mixture cell 18 into which has been injected a vaporized mixture of an isotope to be accelerated and other isotopes. The light pulses pass through the isotopic mixture cell 18, with effects to be described in detail hereinbelow, and are reflected by the second reflecting surface 22, which could be a mirror, along the same path 24 as followed by the outwardly traveling beam, again passing through the isotopic mixture cell 18 with further effects to be described hereinbelow. In this first embodiment in which the phase shifter 16 is not utilized, the light pulses then pass through the dye laser 12 to the first reflecting surface 20, which could comprise a diffraction grating, a prism or other wavelength selective element, and hence return to the dye laser 12 for re-emission.

The present embodiment relies on the reaction of the isotopes contained within the isotopic mixture cell 18 to the coherent light pulses of a particular shape, frequency, duration and intraphase relationship, selected in accordance with the absorption characteristics of the isotope to be excited or accelerated and the other isotopes, and the ability to distinguish and isolate the desired isotopes as a result of this reaction. Continuous radiation or long pulses can only excite at most 50% of a selected transition. Nearly 100% selective excitation is possible with the following coherent pulses provided their duration is short compared with the "phase relaxation time" (collision time in a gas):

1. Gaussian pulses of appropriate energy and duration. There is a combination of pulse duration and pulse energy which gives optimum isotopic selectivity for large (over 50%) excitation of the desired isotope. The Gaussian pulses are applied at resonance with a single photon transition of the selected isotope.
2. "Zero-area" pulses. There is combination of pulse duration and pulse energy which gives optimum isotopic selectivity for large (over 50%) excitation of the desired isotope. The Gaussian pulses are applied at resonance with a single photon transition of the selected isotope. The "zero-area" pulses are applied at resonance with the single photon transition of an unwanted isotope. The excitation of the unwanted isotope occurring in the first portion of the pulse is canceled out in the second (180° out of phase) portion.
3. Gaussian pulses of appropriate energy to give nearly 100% excitation of a selected two-photon transition. There is a pulse duration for that energy that gives optimum isotopic selectivity. The frequency of this pulse has to be close to half the two-photon transition frequency of the selected isotope (slightly off resonance to compensate for the Stark shift induced by the pulse).

4. 90° phase shifted pulses of appropriate energy to give nearly 100% excitation of a selected two-photon transition. The frequency of this pulse has to be close to half the two-photon frequency of the unwanted isotope (slightly off resonance to compensate for the time dependent Stark shift induced by the pulse).

The advantage of using "zero-area" or 90° phase shifted pulses described in paragraphs 3 and 4 above, pertain to "degenerate transitions". The selectivity of excitation is not affected when excitation is made by these pulses. These pulses can be used for two step photoionization as described in U.S. Pat. Nos. 3,443,087, 3,772,519 and 3,935,451, previously referenced instead of the laser source described therein, resulting in an improved efficiency and extraction rate.

The isotopic mixture cell 18 is well known in the art and incorporates means for recovering an isotope as it becomes spatially distinguished from other isotopes contained therein. Referring to FIG. 2, a greatly enlarged area 28 within the isotopic mixture cell 18 is shown through which is passing an outwardly traveling light pulse 29. Also shown are isotopes to be accelerated 30, other isotopes 32 and isotopes to be accelerated after excitation 34 by the light pulse 29.

In one embodiment, the light pulse 29 comprises a Gaussian shaped pulse 36 as shown in FIG. 4 which is formed by the dye laser 12 and consists of coherent light 38 with a wavelength 40 corresponding to the light absorption wavelength of the isotopes to be accelerated 30. Referring again to FIG. 2, as the light pulse 29 passes through the isotopic mixture, it leaves the isotopes to be accelerated 30 in their excited state 34 due to their absorption of a photon contained within the passing pulse 29. As a result of the photon absorption, a momentum increment 42 is imparted to the isotope 30 along the light pulse 29 direction of travel. The other isotopes 32, which are not to be accelerated, experience a complete cycle of excitation/de-excitation 44 which results in a zero net momentum change. During outward travel of the light pulse 29, substantially all of the isotopes to be accelerated 30 are elevated to their excited states, each through the absorption of a photon at its absorption wavelength.

Subsequent to passing through the isotopic mixture cell 18, the light pulse 29 is reflected by the reflecting surface 22 and returns along the same path 24 as it followed during its outward travel. A greatly enlarged area 28 within the isotopic mixture cell 18 is shown in FIG. 3. As the reflected light pulse 43, which continues to have a Gaussian shape 36 as shown in FIG. 4, encounters the isotopes that are to be accelerated and which are in their excited state 34 due to the action of the light pulse 29 passing through the mixture cell 18 during its outward travel (see FIG. 2), they restitute their energy to the light pulse 43 by stimulated emission. During restitution, a photon is emitted along the reflected light pulse's direction of travel, thereby inducing an additional momentum increment 46 opposite to that of the direction of travel of the light pulse 43 and in the same direction as the initial momentum increment 42 which was imparted by the outwardly traveling light pulse 29. As a result of these two momentum increments, one induced by the outwardly traveling light pulse 29 and one by the inwardly traveling light pulse 43, the isotopes to be accelerated 48 have begun to acquire a spatial distinction. Similarly, the other isotopes 32 which are not to be accelerated experience a complete cycle of excitation/de-excitation thereby resulting in a zero net momentum change. The reflected pulse 43 then continues along the same path 24 as that of the outwardly traveling pulse 29 to the dye laser 12 where it is subsequently reflected from the first reflecting surface 20 and repeats the cycle. Thus it can be seen that as pulses which constitute a mode-locked pulse train pass back and forth through the isotopic mixture cell 18, the isotopes to be accelerated 30 are subjected to continuous momentum increments 42 and 46 along the direction of the outwardly traveling pulses.

It is essential that the mirror 22 be close to the cell 18, so that the time between excitation and de-excitation be short compared with the lifetime of the transition involved. Also, the total round trip time of the laser cavity (repetition rate of the mode-locked pulses) should be long compared to that same time. An example in which a Gaussian shaped pulse tuned to a single-photon transition frequency would be used consists of a mixture of $Li^6$ and $Li^7$ with light at a wavelength of 6710 A to accelerate the $Li^6$.

Methods for collection of isotopes due to momentum increments acquired through irradiation are well known in the art. For example, see "Acceleration and Trapping of Particles by Radiation Pressure" by A. Ashkin, in Physical Review Letter Volume 24, Number 4, dated 26 Jan. 1970 on page 156. An alternative is shown in U.S. Pat. No. 3,558,877 wherein a vapor beam containing the desired and undesired isotopes is flowed so that it is substantially orthogonal to and intersects the path of a light beam whereby the momentum acquired by the absorbing isotopes from the light beam causes them to diverge from the original direction of the vapor beam, thereby becoming spatially distinct from the undesired isotopes.

Further embodiments of the invention utilize the phase shifter 16 which separates the outwardly traveling Gaussian shaped light pulse emitted by the dye laser 12 into two contiguous light pulses, shifts the phase of one of the contiguous pulses with respect to the other, and then recombines the reflected, thus separated light pulse into the original Gaussian shaped single light pulse prior to its return to the dye laser 12. Techniques for reconstituting a given light pulse into two portions, one portion of which has a predetermined phase relationship to the other portion, are well known in the art (See for example German Patent P 27 10 785.3). An example of a phase shifter 16 which can accomplish this is a Michelson-type interferometer which can delay 50% of a Gaussian pulse by an uneven number of half or quarter wavelengths.

In a second embodiment of the apparatus, the phase shifter is utilized to delay a portion of the Gaussian shaped light pulse 36 from the dye laser 12 so that a reconstituted light pulse is formed, the second portion of which contains light which is shifted 90° in phase with respect to the light contained in the first portion. The wavelength of the dye laser 12 pulse 36 is formed so that it substantially corresponds to the absorption wavelength of the other isotopes. Referring to FIG. 5, the phase shifter 16 reconstitutes the dye laser output pulse 36 so that it is substantially double peaked 56 with the second half 52 shifted in phase with respect to the first half 54 by 180°. As this pulse 56 exits the phase shifter 16 outwardly along the propagation path 24, it enters the isotopic mixture cell 18 and interreacts with the isotopes to be accelerated 30 in a manner similar to that of the Gaussian shaped pulse 36 of the first embodiment in that momentum increments are imparted to the isotopes to be accelerated 30.

In operation, the phase shifter 16 delays a portion of the Gaussian shaped light pulse 36 from the dye laser 12 so that a reconstituted light pulse is formed having a second portion 52 shifted 180° in phase with respect to the light contained in the first portion 54. The 180° phase shifted pulse 56, or "zero area" pulse, can be seen in FIG. 5. The "zero area" pulse 56 contains light at the absorption, or resonance, wavelength of the other isotopes contained within the isotopic mixture cell 18, but has a frequency spectrum sufficiently wide to contain off-resonance energy at the absorption wavelength of the isotope to be accelerated 30.

When the "zero area" pulse 56 enters the isotopic mixture cell 18, the first portion 52 of the pulse 56 raises the other isotopes to their excited state thereby giving up a photon and imparting a momentum increment along the direction of propagation. However, when the second portion 54 of the "zero-area" pulse 56 which is also at the absorption wavelength of the other isotopes interreacts with the other isotopes in their excited state, they restitute their energy to the pulse by stimulated emission thus imparting a momentum increment opposite to the direction of propagation of the light pulse. These two momentum increments, being in opposite directions, result in a net momentum increment of zero. However, since the "zero-area" pulse 56 contains some energy at the absorption wavelength of the isotopes to be accelerated 30, they are raised to an excited state thereby absorbing a photon of energy and receiving a momentum increment in the direction of propagation. Similarly, the reflected pulse 56 causes the other isotopes to be raised to an excited state by the first half 54 of the "zero-area" pulse 56 thus receiving a momentum increment in the direction of pulse 60 travel. The isotopes then restitute their energy to the second half 52 of the pulse 60 by stimulated emission, thus receiving a momentum increment in the opposite direction and thereby leaving a net momentum increment of zero. Additionally the off-resonance energy contained within the "zero-area" pulse 56 is sufficient to cause the isotope to be accelerated 30 to restitute its energy to the pulse by stimulated emission, thereby receiving a second momentum increment opposite to the direction of propagation and in the same direction as the original momentum increment. Therefore with this embodiment, the desired isotopes receive two momentum increments which are additive while the other isotopes remain with a net momentum of zero. This procedure is particularly useful with an isotope such as a mixture of $U^{235}$ and $U^{238}$ using a wavelength of around 5900 Å to accelerate the $U^{235}$. For this particular example the use of Gaussian pulses would be detrimental due to the degeneracies of the absorbing transitions. Excitation through "zero-area" pulses is not sensitive to degeneracies.

A third embodiment provides for two photon transitions which are required when the excitation level of the isotope to be separated cannot be reached with a single photon due to the unavailability of efficient lasers at that required energy level (as is the case for instance with hydrogen). For selective excitation either a Gaussian pulse near resonance with half the transition frequency of the selected isotope or a 90° phase shifted pulse, near resonance with half the transition frequency of the unwanted element, can be used. The acceleration of particles with Gaussian pulses using two photon transitions is as described in the first embodiment, except that there are two momentum increments per transition.

Referring to FIG. 6, which shows the 90° phase shifted pulse, the light pulse 60 having light contained within the second portion 64 shifted 90° in phase with respect to the pulse of the first portion 66 reacts with the isotope to be accelerated 30 in such a manner that it will absorb two photons to reach a stable excitation state, the absorption thereby causing two momentum increments in the direction of the outwardly traveling light pulse. When the 90° phase shifted pulse 66 is reflected and re-enters the isotopic mixture cell 18, a process similar to that which occurred with the zero-area pulse 56 also occurs. As the light pulse 60 encounters the isotopes to be accelerated they restitute their energy to the passing pulse, again by stimulated emission. However, in this case two photons are restituted thereby imparting two more momentum increments in a direction opposite to that of the travel of the light pulse 60. Therefore for each transmission/reflection cycle of the 90° phase shifted light pulse 60, four momentum increments are imparted to the isotope to be accelerated 30. As the pulse continues on its return path it enters the phase shifter 16 and is reshaped to its original Gaussian shape 36 prior to reentering the dye laser 12. Gaussian pulses for two photon excitation are particularly useful in separating a mixture of Hydrogen $H^1$, Deuterium $H^2$ and Tritium $H^3$, accelerating the isotope to be selected by light at a wavelength of 2431 Å. The 90° phase shifted pulses are useful in separating a mixture of $Li^6$ and $Li^7$. Pulses of 50 mJ from a Rhodamine 6G dye laser at 5710 Å could be used to accelerate the $Li^6$ atoms.

I claim:

1. In a method of separating a particle species from a mixture with other particles through irradiation of said mixture with light, isolating said particle species at a predetermined location spatially distinct from that of said other particles, and collecting said other particles species from said predetermined location, said other particles being capable of substantially absorbing light at a wavelength corresponding to single or multiphoton absorption, said particle species being capable of substantially absorbing light at a wavelength close to, but not equal to, said wavelength and absorbing light differently at said wavelength, the improvement comprising disposing said mixture in a cavity of a mode-locked laser and irradiating said mixture with a plurality of repetitious coherent light pulses of said wavelength, applied to said mixture at said wavelength, each of a duration of less than 10 nanoseconds with a frequency spectrum sufficiently broad to contain energy at the light absorption wavelength of said particle species, the path of said light pulses traversing and reflecting back through said cavity whereby as said mixture is irradiated by said light pulses said particle species initially absorbs then restitutes light of said wavelength during said reflection to impart momentum characteristics to said particle species distinguishing it from the momentum characteristic of said other particles.

2. The improvement of claim 1 in which said light pulses are formed with a dye laser.

3. The improvement of claim 1 in which said light pulses are formed with a dye laser.

4. The improvement of claim 1 in which said particle species and said other particles are isotopes.

5. In a method for spatially separating a first isotope from a mixture containing first and second isotopes having different light absorption characteristics, and collecting said first isotope as it becomes spatially separated from said second isotope, the improvement comprising:
generating repetitious substantially coherent light pulses, each of a duration of less than 10 nanoseconds, with a mode-locked dye laser at a wavelength absorbable by said first isotope;
placing the mixture of said first and second isotopes into a cavity of said laser through which pass both transmitted and reflected light pulses generated by said laser; and
irradiating said mixture with said pulses applied to said mixture at said wavelength whereby said first isotope initially absorbs, then restitutes during said reflection, light at said wavelength, thereby imparting a momentum to said first isotope in the direction of said transmitted light pulse.

6. The improvement of claim 5 wherein said light pulses applied to said isotopes are formed in a substantially bell shape with the light contained therein having a wavelength substantially equal to the light absorption wavelength for single or multiphoton absorption of said first isotope or integral division thereof.

7. An apparatus for accelerating a particle species, comprising:
a mode-locked laser capable of emitting a repetitious beam of coherent light pulses of predetermined wavelength, each of a duration of less than 10 nanoseconds;
means for injecting particle species, which substantially absorbs light in a frequency spectrum no broader than said predetermined wavelength into a cavity of said laser so that said beam is transmitted through said particle species in one direction and is reflected by an end mirror of said laser back through said particles species in the opposite direction so as to restitute in said reflected beam light absorbed from said initially transmitted beam whereby to accelerate said particle species;
means for forming each of said light pulses in a Gaussian shape;
means for altering said Gaussian shaped pulse prior to passing into said cavity to be applied to said mixture at said wavelength;
means for reconstituting said reflected altered pulse to its original Gaussian shape subsequent to said reflected pulse passing through said cavity; and
means for collecting said accelerated particle species.

8. The apparatus of claim 7 for separating said particle species from a mixture with other particles which absorb differently light of said predetermined wavelength, said laser being capable of emitting said pulses at an intensity, wavelength and duration sufficient to distinguish said particle species from said other particles by momentum characteristics acquired during irradiation thereof by said light pulses, said altering means further comprising means for forming said Gaussian shape pulse into first and second partially overlapping Gaussian shaped portions in which the wavelength of said second portion is shifted 90° in phase with respect to that of said first portion.

9. The apparatus of claim 7 for separating said particle species from a mixture with other particles which absorb differently light of said predetermined wavelength, said laser being capable of emitting said pulses at an intensity, wavelength and duration sufficient to distinguish said particle species from said other particles by momentum characteristics acquired during irradiation thereof by said light pulses, said altering means further comprising means for forming said Gaussian shaped pulse into first and second partially overlapping Gaussian shaped portions in which the wavelength of said second portion is shifted 180° in phase with respect to that of said first portion.

10. The apparatus of claim 7 wherein said altering means comprises a Michelson-type interferometer.

11. The apparatus of claim 7 wherein said means for injecting said mixture into said cavity further comprises means for vaporizing such mixture into a beam which intersects said coherent light pulses at an angle of substantially 90°.

12. The apparatus of claim 7 in which said laser is a dye laser.

13. In a method of separating a particle species from a mixture with other particles through irradiation of said mixture with light, isolating said particle species at a predetermined location spatially distinct from that of said other particles, and collecting said particles species from said predetermined location, said other particles being capable of substantially absorbing light at a wavelength corresponding to single or multiphoton absorption, said particle species being capable of substantially absorbing light at a wavelength close to, but not equal to, said wavelength and absorbing light differently at said wavelength, the improvement comprising irradiating said mixture with a plurality of repetitious coherent light pulses at said wavelength, each of a duration of less than 10 nanoseconds with a frequency spectrum sufficiently broad to contain energy at the light absorption wavelength of said particle species, said light pulse being formed with an intensity and duration whereby as said mixture is irradiated by said light pulses said particle species will acquire momentum characteristics distinguishing it from the momentum characteristics of said other particles, said coherent light pulses each being formed into first and second substantially equal portions of the same wavelength and in which light of said second portion is of the same wavelength as, but is substantially 180° out of phase with, light of said first portion.

14. The improvement of claim 13 conducted with a mode-locked laser, said mixture being disposed in a cavity of said laser, the path of said light pulses traversing and reflecting back through said cavity, whereby said particle species initially absorbs, then restitutes during said reflection, light of said wavelength.

15. In a method of separating a particle species from a mixture with other particles through irradiation of said mixture with light, isolating said particle species at a predetermined location spatially distinct from that of said other particles, and collecting said particles species from said predetermined location, said other particles being capable of substantially absorbing light at a wavelength corresponding to single or multiphoton absorption, said particle species being capable of substantially absorbing light at a wavelength close to, but not equal to, said wavelength and absorbing light differently at said wavelength, the improvement comprising irradiating said mixture with a plurality of repetitious coherent light pulses at said wavelength, each of a duration of less than 10 nanoseconds with a frequency spectrum sufficiently broad to contain energy at the light absorption wavelength of said particle species, said light pulse being formed with an intensity and duration whereby as said mixture is irradiated by said light pulses said particle species will acquire momentum characteristics distinguishing it from the momentum characteristics of said other particles, said light pulses being each formed into first and second substantially equal portions of said wavelength in which light of said second portion is of the same wavelength as, but is substantially 90° out of phase with, light of said first portion.

16. In a method for spatially separating a first isotope from a mixture containing first and second isotopes having different light absorption characteristics, and collecting said first isotope as it becomes spatially separated from said second isotope, the improvement comprising:

generating repetitious substantially coherent light pulses, each of a duration of less than 10 nanoseconds, with a mode-locked dye laser at a wavelength absorbable by one of the isotopes;

placing the mixture of said first and second isotopes into a cavity of said laser through which pass both transmitted and reflected light pulses generated by said laser; and irradiating said mixture with said pulses whereby said particle species initially absorbs, then restitutes during said reflection, light at said wavelength, thereby imparting a momentum to said first isotope in the direction of said transmitted light pulse, said light pulses being formed each into first and second substantially equal portions, light of said second portion being shifted 90° in phase with respect to light of said first portion, said pulses being of a wavelength substantially equal to that of the two photon light absorption wavelength of said second isotope, but including energy at the two photon light absorption wavelength of said first isotope.

17. In a method for spatially separating a first isotope from a mixture containing first and second isotopes having different light absorption characteristics, and collecting said first isotope as it becomes spatially separated from said second isotope, the improvement comprising:

generating repetitious substantially coherent light pulses, each of a duration of less than 10 nanoseconds, with a mode-locked dye laser at a wavelength absorbable by one of the isotopes;

placing the mixture of said first and second isotopes into a cavity of said laser through which pass both transmitted and reflected light pulses generated by said laser; and irradiating said mixture with said pulses whereby said particle species initially absorbs, then restitutes during said reflection, light at said wavelength, thereby imparting a momentum to said first isotope in the direction of said transmitted light pulse, said light pulses being formed each into first and second substantially equal portions, light of said second portion being shifted 180° in phase with respect to light of said first portion, said pulses being of a wavelength substantially equal to that of the single photon light absorption wavelength of said second isotope, but including energy at the single photon light absorption wavelength of said first isotope.

* * * * *